United States Patent [19]

Miyoshi et al.

[11] 4,306,910
[45] Dec. 22, 1981

[54] METHOD FOR STRENGTHENING WATER-SATURATED SOFT SOILS

[75] Inventors: Hajime Miyoshi, Koganei; Etsuo Asanagi, Kashiwa, both of Japan

[73] Assignee: Chiyoda Chemical Engineering & Construction Co., Ltd., Kanagawa, Japan

[21] Appl. No.: 153,943

[22] Filed: May 28, 1980

[30] Foreign Application Priority Data

Dec. 29, 1979 [JP] Japan ................ 54-172966

[51] Int. Cl.³ ................................ C04B 7/02
[52] U.S. Cl. ........................ 106/89; 106/97; 106/109; 106/117; 106/900; 405/266
[58] Field of Search ............... 106/89, 109, 117, 900; 405/266

[56] References Cited

U.S. PATENT DOCUMENTS

| | | | |
|---|---|---|---|
| 1,748,839 | 2/1930 | Grunewald | 106/97 |
| 2,182,714 | 12/1939 | Witt | 106/97 |
| 2,947,643 | 8/1960 | Kamlet | 106/97 |
| 3,947,284 | 3/1976 | Kitsugi et al. | 106/89 |
| 4,209,335 | 6/1980 | Katayama et al. | 106/89 |

FOREIGN PATENT DOCUMENTS 46-12064  3/1971  Japan .................. 405/263

*Primary Examiner*—James Poer
*Attorney, Agent, or Firm*—Birch, Stewart, Kolasch and Birch

[57] ABSTRACT

A water-saturated soft soil is efficiently improved in its strength by incorporating thereinto an additive composed of ingredients A, B and C; the ingredient A comprises gypsum, the ingredient B comprises a mixture of 40–55% by weight of a Portland cement and 60–45% by weight of a water-granulated iron blast furnace slag having a particle size almost equal to or smaller than that of the Portland cement and the ingredient C comprises a water-soluble ferrous salt. The ratio by weight of the ingredient A to the ingredient B ranges from 10/90 to 30/70 and the total amount of the ingredients A and B used for the soft soil is sufficient to strengthen the soft soil. The ingredient C is used in an amount sufficient to react with hydrogen sulfide contained in the soft soil to be treated.

5 Claims, 2 Drawing Figures

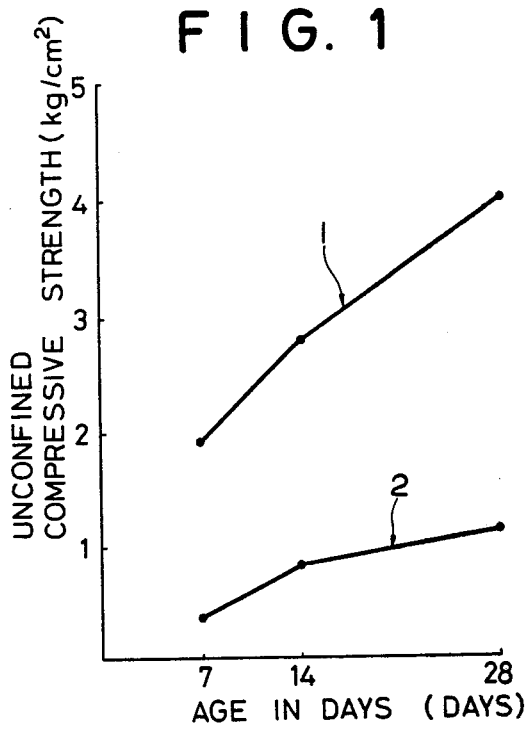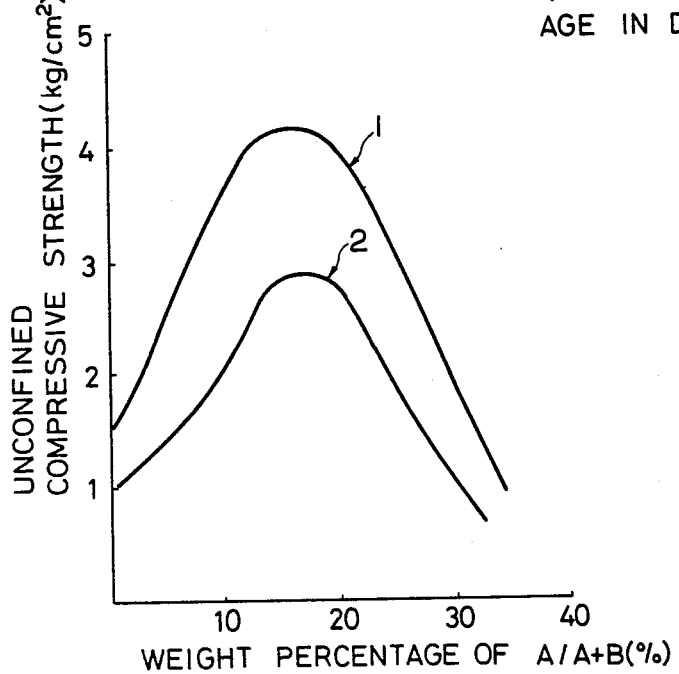

_4,306,910_

METHOD FOR STRENGTHENING WATER-SATURATED SOFT SOILS

BACKGROUND OF THE INVENTION

This invention relates to a method for improving the strength of water-saturated soft soils. More particularly, this invention is directed to a method for improving the strength of such a soft soil while inhibiting the generation of unpleasant odor from the soft soil.

It is generally known from the past to improve the strength of a water-saturated soft soil deposited on the bottom of seashore, river, lake and lagoon so as to enable passage of people or traffic vehicles and conveyance of construction machines on reclaimed soft grounds formed by dredging such water-saturated soft soil. In one such method, a strengthening agent or solidifying agent comprising a cement, quick lime, water glass, asphalt and organic macromolecular substances is added to the soft soil. However, this method is not altogether satisfactory since these strengthening agents are poor in strength-improving effect or are economically unattractive. Especially, in the case of the large-scale treatment of soft soil of a high water content, such as a certain kind of sludge or mud called "hedoro" deposited on the bottom of rivers or the seashore, the amount of soil to be treated in one batch may reach several thousand to several million cubic meters, thus requiring the addition of an extremely large amount of the strengthening agent, and hence the strengthening agent employed should be as cheap as possible and should be capable of remarkably improving the strength in a smaller amount.

In Japanese Unexamined Published patent appln. No. 141459/76 there is disclosed a method wherein a mixture of a cement and gypsum is used as a strengthening agent for the soft soil. The strengthening agent disclosed in this reference exhibits an enhanced strength-improving effect on the water-saturated soft soil as compared with a cement alone or a mixture of a cement and quick lime, but it is still unsatisfactory in practice since both a large amount of the strengthening agent and a long period of time are required to treat a highly water-saturated soft soil so as to impart a practically acceptable strength. This reference suggests the optional use of a water-granulated iron blast furnace slag or fly ash in addition to a cement and gypsum as indispensable ingredients. However, both the water-granulated iron blast furnace slag and the fly ash are not indispensable but optional in this prior art method in view of the proportion defined therein as 0–30%. In this reference, the water-granulated iron blast furnace slag is regarded equivalent in function to the fly ash which is very poor in strength-improving effect and no discussion is made on the properties and technical effects of these optional ingredients. Thus, these ingredients are recognized in this reference only as a filler or the like additive for reducing the cost of the indispensable strengthening agents. Moreover, this prior art method fails to contemplate improvement in strength of such a water-saturated soft soil containing organic matters and generating unpleasant odor.

In addition to the difficulty in handling and transporting of water-saturated soft soils, a further problem often arises in that an unpleasant odor is released from the soft soil, rendering the life environment degraded. Though some countermeasures have been proposed hitherto for the deodorization of various materials, an effective method which in the treatment of soft soil can accomplish both improvement in strength and deodorization has not yet been developed.

BRIEF SUMMARY OF THE INVENTION

It is, therefore, an object of the present invention to provide a method for improving the strength of a water-saturated soft soil economically in high efficiency.

It is another object of the present invention to provide a method for improving the strength of a water-saturated soft soil without increasing the alkalinity thereof and without producing undesirable internal strain thereof.

It is still another object of the present invention to provide a method for improving the strength of a water-saturated soft soil with unpleasant odor while attaining the deodorization of the soft soil.

Other objects, features and advantages of the present invention will become apparent from the detailed description of the invention which follows, when considered in light of the accompanying drawings, in which:

FIG. 1 is a graph showing the influence of the sort of water-granulated iron blast furnace slag in the ingredient B on the increase in strength of a water-saturated soft soil when a combination of the ingredients A and B is used for treating the soft soil.

FIG. 2 is a graph showing the influence of the proportion of the ingredient A to the ingredients A and B in the additive on the increase in strength of the treated soft soil.

DETAILED DESCRIPTION OF THE INVENTION

The present invention provides a method for increasing the strength of water-saturated soft soils, which comprises admixing the soft soil with an additive comprising the ingredients A, B and C. The ingredients A and B can react effectively with soil components of the soft soil and serve to improve its strength, whereas the ingredient C serves to inhibit the generation of an unpleasant odor from the soft soil. Thus, the additive used in the present invention is comprised of the following ingredients:

Ingredient A: gypsum ($CaSO_4.2H_2O$)
Ingredient B: a mixture of 40–55% by weight of a Portland cement and 60–45% by weight of a water-granulated iron blast furnace slag.
Ingredient C: a water-soluble ferrous salt Any gypsum in the form of powder or granules can be used as the ingredient A. The term "gypsum" is used herein to mean calcium sulfate dihydrate exclusively. No limitation is set for the particle size of the gypsum. Accordingly, gypsum formed as a by-product in a process for the desulfurization of flue gas can advantageously be used as such for the present invention.

An Ordinary Portland cement satisfying the specifications defined in JIS R-5210 for "Portland cements" is suitable for use as the Portland cement in the ingredient B. According to the nature of a water-saturated soft soil and the treatment conditions, the Ordinary Portland cement may be used alone or as a mixture with a moderate heat Portland cement, a high early strength Portland cement and/or a ultrahigh early strength Portland cement.

The water-granulated iron blast furnace slag used together with the Portland cement in the ingredient B is prepared from a by-product from an iron blast furnace by rapidly cooling the slag with water to form sand-like granules of the slag having a particle size of 1-5 mm, and then finely dividing the granules to have a particle diameter of 100-1μ (referred to hereinafter as the water-granulated iron blast furnace slag). The composition of the water-granulated iron blast furnace slag varies according to the composition of iron ores used or on the operation conditions of the blast furnace but is generally as follows:
$SiO_2$ 30-35%, $Al_2O_3$ 13-18%, CaO 38-45%, $Fe_2O_3$ 0.5-1.0%
MgO 3-6%, S 0.5-1.0%, MnO 0.5-1.5% and $TiO_2$ 0.5-1.0%.

The water-granulated iron blast furnace slag to be mixed with the Portland cement to form the ingredient B is pulverized to have a specific surface area of at least 2000 cm$^2$/g (particle diameter of not greater than 10μ) preferably 3600 cm$^2$/g (particle diameter of not greater than 5μ) when measured according to the Blaine's air permeability method (JIS R-5201). Thus, it is seen that the particle diameter of the water-granulated iron blast furnace slag is almost equal to or smaller than that of the Portland cements defined in JIS R-5210, wherein Ordinary Portland cement is defined to have a specific surface area of at least 2500 cm$^2$/g. If the particle size of the slag becomes excessively large, its reactivity will decrease seriously; thus, when the finely pulverized water-granulated iron blast furnace slag having a particle size almost equal to the Portland cement is used in the present invention, the treated soft soil is typically 3-4 times as high in strength as soft soil treated with an additive which includes ordinary water-granulated iron blast furnace slag of coarse grains.

It is important that the water-granulated iron blast furnace slag be mixed homogeneously with the Portland cement prior to being added to the soft soil to be treated in order to promote its reactivity.

The proportion of the Portland cement in the ingredient B is maintained within the range of 40-55% by weight (the balance being essentially the slag). If the proportion of the cement is less than 40% by weight, the strength-improving effect on a highly water-saturated soft soil will be reduced. On the other hand, if the proportion of the cement exceeds 55% by weight, a significant amount of heat will be evolved during the strength-improving treatment, thus resulting in the formation of internal strain in the treated soft soil. In addition, the use of an excess amount of the cement results in a higher content of calcium hydroxide in the treated soft soil. This is undesirable because the treated soft soil is then strongly alkaline and is susceptible to erosion with sewer or sea water. Preferably, the relative proportion of the components in the ingredient B are 50% by weight of the Portland cement and 50% by weight of the water-granulated iron blast furnace slag.

As the ingredient C, both organic and inorganic ferrous salts can suitably be used so far as they are soluble in water. The use of ferrous sulfate or ferrous chloride is preferable for reasons of economy and influence on the ingredients A and B. Above all, ferrous sulfate is most preferable because it is available in large quantities as a by-product in the production of titanium. In titanium-manufacturing plants, ferrous sulfate is generally discarded as industrial waste so that the utilization of this salt for the treatment of a water-saturated soft soil serves a dual purpose.

The ingredient C, i.e. a water-soluble ferrous salt, can exhibit a deodorizing effect on a water-saturated soft soil having an unpleasant odor under neutral or weakly alkaline conditions under which the ingredients A and B are used, without adversely affecting the strength-improving effect of the ingredients A and B. The ferrous salt can react, under the treatment conditions according to the method of this invention, with hydrogen sulfide, which is a main source of the unpleasant odor of "hedoro" or the like soft soils and fix the hydrogen sulfide according to the following reaction formula:

$$H_2S + Fe^{++} \rightarrow FeS(solid) + 2H^+$$

The reaction can favorably proceed even in the presence of carbon dioxide, which is important since in a sludge or mud emitting unpleasant odor, carbon dioxide is usually present in a larger amount than hydrogen sulfide. However, the ferrous salt can preferentially react with the hydrogen sulfide and, after completion of the reaction therewith, reacts with carbon dioxide to form harmless ferrous carbonate (siderite). The solubility of the ferrous salt in acidic and neutral solutions is hardly influenced by pH and the above $H_2S$-fixing reaction smoothly proceeds in a pH range between about 4.5 and 8.5. In contrast, ferric salts are found to exhibit no remarkable deodorizing effect under the treatment conditions of this invention.

Hereinbelow will be described in some detail the fundamental method of this invention using an additive comprising the ingredients A and B but without ingredient C.

The water-saturated soft soil to be treated is first admixed with the ingredient A so that the soft soil may be made reactive with the ingredient B to be added subsequently. In this case, the ingredient A is dispersed into the soft soil and dissolved in or wetted with the soft soil whereby the soft soil is converted into a preferable reaction medium for the ingredient B. Since the amount of the ingredient A added is small and since the ingredient A exhibits no increase in viscosity, unlike ingredient B, the homogeneous mixing of the soft soil with the ingredient A may be performed without difficulty.

The water-saturated soft soil thus enhanced in reactivity is then admixed with the ingredient B. By adding the ingredient B to the preformed admixture of the soft soil and the ingredient A, various reactions for improving the strength of the water-saturated soft soil take place, including the reaction between the ingredients A and B, the hydration of the ingredient B and a reaction between the soft soil and the ingredients A and B. These reactions for improving the strength of the water-saturated soft soil proceed with good efficiency since the soft soil to which the ingredient A has been added is converted into a preferable reaction medium for the ingredient B.

More specifically, in this treatment procedure, a reaction resulting in the formation of ettringite ($3CaO.Al_2O_3.3CaSO_4.32H_2O$) is believed to take place between the soft soil and the ingredients A and B. As the water-saturated soft soil has been homogeneously admixed with the ingredient A in the first step of the treatment, the reaction for the formation of ettringite takes place smoothly allover the treated soft soil upon addition of the ingredient B, whereby rapid improvement in strength of the soft soil is attained.

In the present invention it is of particular advantage that the water-granulated iron blast furnace slag used as one component of the ingredient B has finely been pulverized to have a particle size almost equal to or smaller than the Portland cement used as the other component and is previously mixed homogeneously with the cement before used. When, therefore, the ingredient B is added to the soil containing ingredient A, the water-granulated iron blast furnace slag is readily stimulated with slaked lime, formed by the hydration reaction of the Portland cement, thereby promoting the reaction for forming ettringite and thus accelerate the soil-strengthening effect. To say it in another way, whilst the water-granulated iron blast furnace slag itself shows no hydraulic property, unlike cement, it begins to exhibit such property when brought into contact with a stimulating agent such as a slaked lime. In case of the method of this invention wherein the water-granulated iron blast furnace slag is finely pulverized to become reactive and is previously mixed homogeneously with the Portland cement so as to be stimulated with slaked lime formed by the hydration reaction of the cement, the water-granulated iron blast furnace slag shows the same hydraulic property as shown by the cement.

In the method of this invention, the strength of the treated soft soil is also believed to be improved by a Pozzolan reaction between calcium ion and silicate ion in addition to the reaction for the formation of ettringite. As the water-granulated iron blast furnace slag used in the present invention is in a finely pulverized form, it serves as a reactant also for this Pozzolan reaction.

Anyway, the water-granulated iron blast furnace slag per se is considered in this invention to participate efficiently in the reactions for improving the strength of the water-saturated soft soil and apparently contributes efficient promotion of more complex chemical reactions whereby an improvement in strength of the soft soil is rapidly achieved, in contrast to the prior art methods utilizing mainly the hydration reaction of a cement.

In order to attain such rapid strength improvement, it is important to specify the proportion of the ingredient A relative to the ingredient B. In the method of this invention, this proportion is so selected that the ratio by weight of the ingredient A, calculated as gypsum, to the ingredient B, calculated as a mixture of the Portland cement and the water-granulated iron blast furnace slag, is within the range from 10/90 to 30/70. Use of relative proportions of the ingredients A and B outside this range reduces the technical merit achieved by the addition of the ingredients A and B.

For improving the strength of a water-saturated soft soil, it is desirable that the soft soil be admixed first with the ingredient A and then with the ingredient B as described hereinbefore. In some cases, however, the soft soil may be admixed with the ingredients A and B simultaneously. However, admixing of the water-saturated soft soil first with the ingredient B and then with the ingredient A is extremely disadvantageous because the resulting mixture is difficult to work and also only a poor improvement in strength is obtained. Both ingredients A and B can be used either in a powdery or slurried form in the method of this invention.

According to the method of this invention, the reactions between the soft soil and the ingredients A and B are promoted in an extremely high efficiency unlike the case of the prior art methods so that the maximal strength-improving effect is expected to the soft soil. Thus, only relatively small amounts of the ingredients A and B are needed in order to achieve the desired strength and, moreover, the treatment time required is short. In general, the strength required for the treated soft soil in the field is about 0.5–2 kg/cm$^2$ in terms of unconfined compressive strength. In general, these levels can be achieved according to the present invention by admixing the soft soil with the ingredients A (calculated as gypsum) and B (calculated as a mixture of a Portland cement and a water-granulated iron blast furnace slag) in a total amount of about 50–150 kg per cubic meter of the soft soil. In case the soft soil contains a large amount of organic materials and emits strong bad odors, it is desirable to increase the total amount of the ingredients A and B in comparison with the case where the soft soil contains no or a little organic materials. When the soft soil has a low content of organic materials, a total amount of the ingredients A and B within the range of 50–100 kg per cubic meter of the soft soil is usually sufficient to furnish it with a satisfactory strength.

The method of the present invention is not influenced by the water content of the water-saturated soft soil and is applicable to water-saturated soft soils having a wide range of water content, for example a water content of 50–200%, or even to highly water-saturated soft soils having a water content as high as 500–1000%. When the method of this invention is applied to a highly water-saturated soft soil, excess water will be separated from the treated soft soil onto the surface thereof.

In the method of the present invention, the amount of the Portland cement used is relatively small, so that the generation of heat resulting from the hydration reaction of the cement is generally insufficient to cause an undesirable development of strain in the treated soft soil. Moreover, the quantity of residual alkalis in the treated soft soil is small, so that no significant increase in alkali concentration is found in the treated soft soil, and the risk of erosion of the treated soil by e.g. sewer or sea water, is minimized. The present invention is economically very advantageous in that the total amount of the ingredients is small and the amount of the Portland cement is decreased with increase in the amount of the water-granulated iron blast furnace slag.

The method of this invention is thus advantageously applied not only for improving the strength of reclaimed soft grounds but also for improving the nature of soft soil or sludge deposited on the bottom of sea, river and the like.

The method wherein the ingredients A and B are used is effective to furnish a water-saturated soft soil with a satisfactory strength but is not sufficient in deodorization of the soft soil. Thus, the above method cannot be applied to treat a water-saturated soft soil having a strong unpleasant odor. To achieve both improvement in strength and deodorization of water-saturated soft soils, a combination of the ingredients A, B and C is used in accordance with the present invention.

The ingredient C may be added to the soft soil being treated at any time prior to the addition of the ingredient B. Concerning the order of adding the ingredients A, B and C to the soft soil, therefore, the following possibilities exist: the ingredients are added in the order (C-A-B); the ingredients are added in the order (A-C-B); ingredients A and C are first added simultaneously and then the ingredient B is added; and the ingredient C is first added and then ingredients A and B are added simultaneously. In case of adding the ingredients A and C or A and B simultaneously, these ingredients are added separately or in the form of a mixture. If the soft soil to be treated has a strong unpleasant odor, it is preferable to add the ingredient C first to effect deodorization preferentially, and therefore to facilitate its subsequent handling, and, thereafter, to add ingredients A and B simultaneously to effect the strength improvement. The ingredient C should not be mixed or added simultaneously with the ingredient B since the strength improvement effect is then found to be impaired.

In order to facilitate homogeneous dispersion of the ingredient C in the soft soil, it is preferred that the ingredient C be added as an aqueous solution. Alternatively, a method wherein the ingredient C is first mixed homogeneously with the ingredient A and the resulting mixture is dispersed in the soft soil is also preferred. In the latter case, the homogeneous mixture can suitably be obtained by mixing the ingredient A in a solid or slurried form with an aqueous solution of the ingredient C. The resulting mixture can be added to the soft soil directly or after being dried.

The ingredient C is used in an amount sufficient to fix hydrogen sulfide contained in the soft soil, but since the amount of hydrogen sulfide present varies according to the origin of the soil, the amount of the ingredient C cannot specifically be defined. In general, however, the ingredient C is desirably added at least in a stoichiometric amount, preferably in a 1-3 molar proportion with respect to the amount of the total hydrogen sulfide contained in the soft soil to be treated. The term "total hydrogen sulfide" is used herein to mean all forms of hydrogen sulfide, dissociated and non-dissociated (free), in water contained in the soft soil and bound by sorption to solids in the soft soil but does not include the sulfur moiety of water-insoluble metal sulfides. The amount of such total hydrogen sulfide contained in the soft soil can be determined by subjecting a sample of the soft soil to steam distillation and quantitatively analyzing the distilled hydrogen sulfide. Insoluble sulfides combined with metals can be determined by adding concentrated sulfuric acid to the distillation residue in the analysis of the total hydrogen sulfide and subjecting the mixture again to steam distillation and analyzing the quantity of hydrogen sulfide evolved. Unreacted ingredient C added in an excess amount is reacted, as described hereinbefore, with carbon dioxide to form siderite or is captured by cationic exchangers contained in the soft soil whereby the soluble ferrous salt is all fixed. Consequently, addition of the ingredient C in an excessive amount to the soft soil to be treated does not adversely affect the strengthening effect of the ingredients A and B so far as the amount of the ingredient C does not exceed the ferrous salt-fixing capacity of the soft soil.

The present invention will now be illustrated by the Examples which follow. In Examples 1-4, powderly gypsum (average particle diameter: $53\mu$, water content: 9%, composition: CaO 31.2% and $SO_3$ 44.1%) produced as by-product in the desulfurization treatment of waste gas was used as the ingredient A, and a homogeneous mixture of (X) Ordinary Portland cement (specific surface area: 2500 $cm^2/g$ measured according to the Blaine's air permeability method) and (Y) a water-granulated iron blast furnace slag (specific surface area: 3600 $cm^2/g$ measured according to the Blaine's air permeability method, composition: $SiO_2$ 33.5%, $Al_2O_3$ 15.7%, CaO 42.5% and $Fe_2O_3$ 0.7%, a vitreous substance free from crystalline substances as a result of an X-ray diffraction test) was used as the ingredient B. In Examples 1-3, a muddy marine deposit having a water content of 260% (particle size distribution: $0-20\mu$ 72%, $20-50\mu$ 17% and $50-150\mu$ 10%; an average particle diameter: $7\mu$) and a density of 1.20 $g/cm^3$ at a water content of 260% was used as a water-saturated soft soil to be treated. In Example 4, a river sediment (soft soil) having a water content of 384.4% (particle size distribution: $0-5\mu$ 46%, $5-20\mu$ 49% and above $20\mu$ 5%; an average particle diameter: $5.2\mu$), a density of 1.148 $g/cm^3$ at a water content of 348.4%, a pH value of 8.0 and an ignition loss of 23.7% was used as a water-saturated soft soil to be treated. This soft soil had unpleasant odor and the gas evolved therefrom contained 1800-2000 ppm of hydrogen sulfide. This soft soil had a total hydrogen sulfide content of 430 mg (12.6 m-mol)/kg, an insoluble sulfide content of 2386 mg (70.2 m-mol)/kg and a total organic matter content of 21.2 wt.%/kg. The total hydrogen sulfide content was determined by measuring by way of iodometry the quantity of free hydrogen sulfide distilled during the steam distillation of the soft soil to be treated. The insoluble sulfide content was determined by adding concentrated sulfuric acid to the distillation reside in the analysis of the total hydrogen sulfide, subjecting the mixture again to steam distillation, and analyzing the quantity of hydrogen sulfide distilled. The organic matter content was measured by a testing method using chromic acid.

Example 1

To 1 $m^3$ of the soft soil was added 20 kg of the ingredient A and the mixture was homogeneously mixed in a kneader. To the mixture was then added 80 kg of the ingredient B (X/Y=50/50) and the whole was thoroughly mixed in the kneader. A sample of the mixture was then injected into a cylindrical mold of 50 mm in inside diameter and 100 mm in height, maintained at 20° C. in a constant temperature and humidity box for a given period of time to effect curing the sample, and then released from the mold for the measurement of its unconfined compressive strength.

For the purpose of comparison, a similar test was performed except that a water-saturated iron blast furnace slag in the form of coarse granules (Y') was used.

The result of these tests is shown in Table 2 and as a graph in FIG. 1. The particle size distribution of the water-granulated iron blast furnace slags Y and Y' used is shown in Table 1.

TABLE 1

| Sort of the water-granulated iron blast furnace slags | Passing weight (%) Size of sieves (mm) | | | | | | | | |
|---|---|---|---|---|---|---|---|---|---|
| | 0.01 | 0.03 | 0.088 | 0.15 | 0.3 | 0.6 | 1.2 | 2.5 | 5 |
| Y | 40.5 | 84.0 | 100 | — | — | — | — | — | — |
| Y' | | | | 5.0 | 17.5 | 40.0 | 60.5 | 87.0 | 99.5 |

TABLE 2

| | Unconfined compressive strength (kg/cm$^2$) Age in days | | |
|---|---|---|---|
| Examples | 7 | 14 | 28 |
| The present invention | 1.9 | 2.8 | 4.0 |
| Comparative Example | 0.4 | 0.8 | 1.1 |

In the graph of FIG. 1, the abscissa stands for the age in days after the treatment and the ordinate for the unconfined compressive strength of the treated soft soil (kg/cm$^2$). The line 1 stands for the result of the test in accordance with the present invention while the line 2 for the result of the Comparative run using furnace slag Y'.

Example 2

A test was performed in the same manner as described in Example 1 except that the proportion of the ingredient A to the ingredient B was varied. The result of the test is shown in FIG. 2.

In the graph of FIG. 2, the abscissa stands for the percent ratio by weight of the ingredient A to sum of ingredients A and B (A/A+B×100) while the ordinate for the unconfined compressive strength of the treated soft soil. In this graph, curves 1 and 2 show results obtained for the treated soft soil 4 weeks and 2 weeks after the treatment, respectively.

Example 3

A test was performed in the same manner as described in Example 1 except that the method of adding the ingredients A and B to the soft soil used in Example 1 was modified.

For the purpose of comparison, a test was also performed in such manner that the ingredient B was first added to the soft soil and then the ingredient A was added thereto.

The result of these tests is shown in Table 3.

TABLE 3

| Test | Order of addition of the ingredients (first) | (second) | Workability | Cost for work | Comparison in strength |
|---|---|---|---|---|---|
| I | A | B | Good | Small | 100 |
| II | A and B at the same time | | Generally good | Medium | 98 |
| III | B | A | Bad | Great | 87 |

Example 4

To 1 m$^3$ of the soft soil was added two or three of the ingredients A-E as shown below in the order as indicated in Table 4 and the mixture was thoroughly mixed in a mill. The mixture was then molded in the same manner as described in Example 1 to obtain a mold. Each mold was then subjected to a series of tests to measure its unconfined compressive strength, the amount of hydrogen sulfide evolved therefrom and the pH value according to the elusion test stipulated in Notification No. 2 of the Ministry of Environment. The result of the tests is shown in Table 4.

Ingredient A: 26 kg
Ingredient B: (X/Y=50/50) 104 kg
Ingredient C: 52 l of an aqueous solution of ferrous sulfate having a Fe$^{++}$ concentration of 15.6 g (0.279 mol)/l
Ingredient D(1): 100 kg of slaked lime
Ingredient D(2): 15 kg of slaked lime
Ingredient D(3): 1 kg of slaked lime
Ingredient E: 52 l of an aqueous solution of ferric sulfate having a Fe$^{+++}$ concentration of 15.6 g (0.279 mol)/l In Table 4, C+A, A+B and C+A+B mean simultaneous addition of the ingredients C and A, A and B, and C, A and B, respectively. The marks given with respect to evaluation of unpleasant odor mean as follows:
+ ... very weak
++ ... moderate +++ ... strong

TABLE 4

| Exp. No. | Order of addition of the ingredients (1) | (2) | (3) | Unconfined compressive strength (kg/cm$^2$) Age in days 3 | 7 | 14 | H$_2$S (ppm) | Evaluation of unpleasant odor | pH |
|---|---|---|---|---|---|---|---|---|---|
| 1 | C | A | B | 0.30 | 0.91 | 1.10 | trace | + | 9.46 |
| 2 | C + A | B | — | 0.29 | 0.94 | 1.02 | " | + | 9.44 |
| 3 | C | A + B | — | 0.29 | 0.92 | 1.11 | " | + | 9.46 |
| 4 | A | C | B | 0.30 | 0.93 | 1.01 | " | + | 9.45 |
| 5 | A | B | — | 0.40 | 0.80 | 1.01 | 5 | +++ | 9.69 |
| 6 | C + A + B | — | — | 0.12 | 0.50 | 0.71 | 2 | ++ | 9.68 |
| 7 | D(1) | — | — | * | * | * | trace | + | 11.20 |
| 8 | D(2) | A | B | 0.19 | 0.84 | 1.09 | " | + | 10.45 |
| 9 | D(3) | A | B | 0.20 | 0.87 | 1.12 | " | + | 10.02 |
| 10 | E | A | B | 0.11 | 0.43 | 0.68 | 7 | ++ | 9.50 |

(Remarks)
*The strength was not improved

In Experiment Nos. 1–4 according to the present invention, hydrogen sulfide contained in the soft soil was fixed by addition of the ingredient C and no free hydrogen sulfide was evolved. In these experiments, the measured values of the unconfined compressive strength were almost equal. In Experiment No. 5 given for comparison wherein the ingredient C was missing, the strength of the soft soil was improved but generation of hydrogen sulfide in an amount of 5 ppm was detected. A result of Experiment No. 6 wherein the ingredient C was used is superior in deodorizing effect to a result of Experiment No. 5 but is inferior in unconfined compressive strength to results of Experiment Nos. 1–4 of the present invention and Experiment No. 5 given for comparison. This is ascribable to the reason that the ingredient C added simultaneously with the strength-improving ingredients A and B adversely affected the reaction between the soft soil and the ingredients A and B. In Experiment No. 7 given for comparison wherein the ingredient D(1) alone was used, the deodorizing effect was found excellent but no improvement was attained in strength in terms of the unconfined compressive strength. Accordingly, the ingredient D(1) is unsuited as a strengthening for the soft soil and, moreover, it tends to give a harmful effect to the environment because of its high alkalinity shown by the tabulated pH value. Experiment Nos. 8 and 9, also given for comparison, wherein the ingredients D(2) and D(3)

were used, respectively, exhibited excellent deodorizing effect but had a considerable disadvantage in that the treated soft soil had a high pH value. Experiment No. 10 wherein the ingredient E was used, gave extremely inferior results in both improvement in strength and deodorization. Thus, the ingredient E is quite unsatisfactory for practical use.

Experiment Nos. 1-4 according to the present invention were each good in workability and low in cost. On the other hand, in case of Experiment Nos. 8-9 given for comparison wherein improvement in both strength and deodorization was remarkable, the viscosity of the soft soil was extremely increased when the ingredient D (slaked lime) was added thereto and thus workability of the soft soil became seriously bad.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for improving the strength of a water-saturated soft soil with unpleasant odor, which comprises admixing the soft soil with an ingredient A comprising gypsum, an ingredient B comprising a mixture of 40-55% by weight of a Portland cement and 60-45% by weight of a water-granulated iron blast furnace slag and a deodorizing ingredient C comprising a water-soluble ferrous salt, the slag having a particle size almost the same as or less than that of the cement, the ratio by weight of the ingredient A to the ingredient B being within the range from 10/90 to 30/70, and the order of adding the ingredients A, B and C being such that the soft soil is admixed with the ingredient A before or simultaneously with the ingredient B and that the ingredient C is added prior to addition of the ingredient B.

2. A method according to claim 1, wherein the ingredient C is an aqueous solution of the ferrous salt.

3. A method according to claim 2, wherein the ferrous salt is ferrous sulfate.

4. A method according to claim 1, wherein the total amount of the ingredients A and B is 50-150 kg per cubic meter of the soft soil.

5. A method according to claim 1, wherein the Portland cement is Ordinary Portland cement.

* * * * *